(12) United States Patent
Metelski

(10) Patent No.: US 7,823,691 B2
(45) Date of Patent: Nov. 2, 2010

(54) APPARATUS FOR RETAINING A COMPONENT THAT TRANSFERS SOLID-BORNE SOUND

(75) Inventor: Andrzej Metelski, Romanshorn (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 1174 days.

(21) Appl. No.: 11/387,168

(22) Filed: Mar. 23, 2006

(65) Prior Publication Data
US 2006/0250685 A1 Nov. 9, 2006

(30) Foreign Application Priority Data
Mar. 24, 2005 (DE) .................. 10 2005 014 376

(51) Int. Cl.
*F16F 7/00* (2006.01)
*G02B 21/24* (2006.01)

(52) U.S. Cl. ........................ 181/207; 359/368

(58) Field of Classification Search ............ 181/207, 181/208; 359/368
See application file for complete search history.

(56) References Cited

U.S. PATENT DOCUMENTS

| 4,226,758 | A | * | 10/1980 | Sumira | 523/153 |
| 4,835,972 | A | * | 6/1989 | Tugal et al. | 62/50.1 |
| 5,366,193 | A | * | 11/1994 | Lindsay | 248/183.2 |
| 6,364,268 | B1 | * | 4/2002 | Metelski | 248/317 |
| 6,567,212 | B1 | * | 5/2003 | Engelhardt et al. | 359/368 |
| 2002/0166942 | A1 | * | 11/2002 | Metelski | 248/676 |
| 2004/0190131 | A1 | * | 9/2004 | Brenner et al. | 359/384 |

* cited by examiner

*Primary Examiner*—Jeffrey Donels
*Assistant Examiner*—Jeremy Luks
(74) *Attorney, Agent, or Firm*—Hodgson Russ LLP

(57) ABSTRACT

An apparatus for retaining a component that transfers solid-borne sound includes a solid-borne sound damper having at least one spacer made of brake lining material arranged in association with the component.

9 Claims, 2 Drawing Sheets

APPARATUS FOR RETAINING A COMPONENT THAT TRANSFERS SOLID-BORNE SOUND

CROSS REFERENCE TO RELATED APPLICATIONS

This application claims priority of the German patent application 10 2005 014 376.8 filed Mar. 24, 2005 which is incorporated by reference herein.

FIELD OF THE INVENTION

The invention relates to an apparatus for retaining a component that transfers solid-borne sound.

BACKGROUND OF THE INVENTION

Retainers for the vibration-free holding of components, in particular of components that, by their nature, transfer or generate noise via airborne sound or solid-borne sound, must meet a variety of requirements. The transfer of solid-borne sound is also accompanied by acoustic amplification effects which, for example, excite a large object or a housing to vibrate, thus generating undesired noise.

On the one hand these retaining devices must not transfer noise or must minimize that noise; on the other hand the component needs to be securely and permanently retained or held. The transfer of vibration and solid-borne sound occurs more intensely whenever a metallic connection exists between the sound generator and a housing.

Solutions for secure holding are known that minimize noise production by way of a complex damper and a rubber mount for the component. This requires, however, a large amount of space.

The known solutions are unusable, however, if that space is not available and if, for example, an electric motor must be held in a small space in secure and vibration-free fashion and in a manner that damps solid-borne sound.

In the field of surgical microscopes, a plurality of miniature electric motors are built into the microscope stand or the microscope in order to control, inter alia, the X-Y focusing drive system. This focusing drive system is installed in the surgical microscope, however, at a point that is located close to the viewing eyepiece for the surgeon. This closeness means that even the slightest vibrations and noise are perceived by the surgeon. In surgical procedures lasting several hours, this irritation can result in a loss of concentration on the part of the surgeon.

SUMMARY OF THE INVENTION

It is therefore the object of the present invention to retain the component that transfers solid-borne sound in secure and vibration-free fashion and in a manner that damps solid-borne sound.

This object is achieved, according to the present invention, by the features described in the present specification.

The invention is characterized in that the component that transfers solid-borne sound has associated with it a solid-borne sound damper having at least one spacer made of brake lining material. The spacer is made of a commercially available material for brake linings, such as that also used in the automotive sector. The inventor has recognized that this material is very suitable for vibration-free holding, and ensures a high level of solid-borne sound damping.

It is also characterized in that it sustains a high level of compressive load capacity. This means that any retaining screws that are used can be tightened with a large amount of torque. The brake lining is also characterized in that it ensures a high level of dimensional stability. The high levels of dimensional stability and compressive load capacity result in a secure threaded connection.

In a development of the invention, the component is retained on a housing by way of the spacer made of brake lining material. This ensures that no metallic contact exists between the component and the housing, and thus no sound or vibration is transferred to the housing.

In an embodiment of the invention, the component is configured as an electrical drive system, in particular as a miniature electric motor. Such drive systems can be accommodated in space-saving fashion, but require a holder that prevents the transfer of vibration and/or noise that occurs in the electric motor.

In a development of the invention, the housing is embodied as part of a stand, and the stand carries a surgical microscope. It is of course also within the scope of the invention to arrange the retaining apparatus in the surgical microscope.

In a further embodiment of the invention, the component has associated with it two spacers arranged opposite one another and made of brake lining material, and the two spacers are connected in non-positively engaged fashion to an attachment flange of the housing.

In a development of the invention, the non-positively engaged connection comprises at least one screw, the screw being guided through the two spacers and the attachment flange and being connected to the component. As a result of this arrangement, once again no direct metallic connection exists, by way of the screw, between the attachment flange of the housing and the component, so that no solid-borne sound generated by the component is transferred to the housing.

In a further embodiment of the invention, at least one O-ring is arranged between the screw and the holder for vibration isolation. The result of this is that the screw is isolated from the holder by the O-ring. This also ensures that no metallic connection exists between one or more screws and the holder or housing.

In a development of the invention, the spacer is embodied as a spacing ring made of brake lining material having a diameter of 32 mm. The spacer or spacing ring can be, for example, a brake lining having the commercial designation "F1045" of the company styled Furka Reibbelege AG, Switzerland.

In a development of the invention, the spacer or spacing ring has a thickness of at least 0.5 mm, preferably 1 mm, thus guaranteeing sufficient damping of solid-borne sound with a small physical size.

In a development of the invention, the apparatus having the spacer or spacing ring made of brake lining material is used, together with a miniature electric motor, in a stand of a surgical microscope and/or in a microscope.

In a further embodiment of the invention, the above-described apparatus is used in a device having decreased-noise properties. The apparatus can usefully be utilized wherever electric motors reach high rotation speeds or the electric motors are connected directly to a housing, and vibration or solid-borne sound is therefore transferred to the housing and additionally amplified therein.

BRIEF DESCRIPTION OF THE DRAWINGS

The invention will be explained in more detail with reference to two exemplifying embodiments with the aid of the schematic drawings, in which.

DETAILED DESCRIPTION OF THE INVENTION

Figure 1:
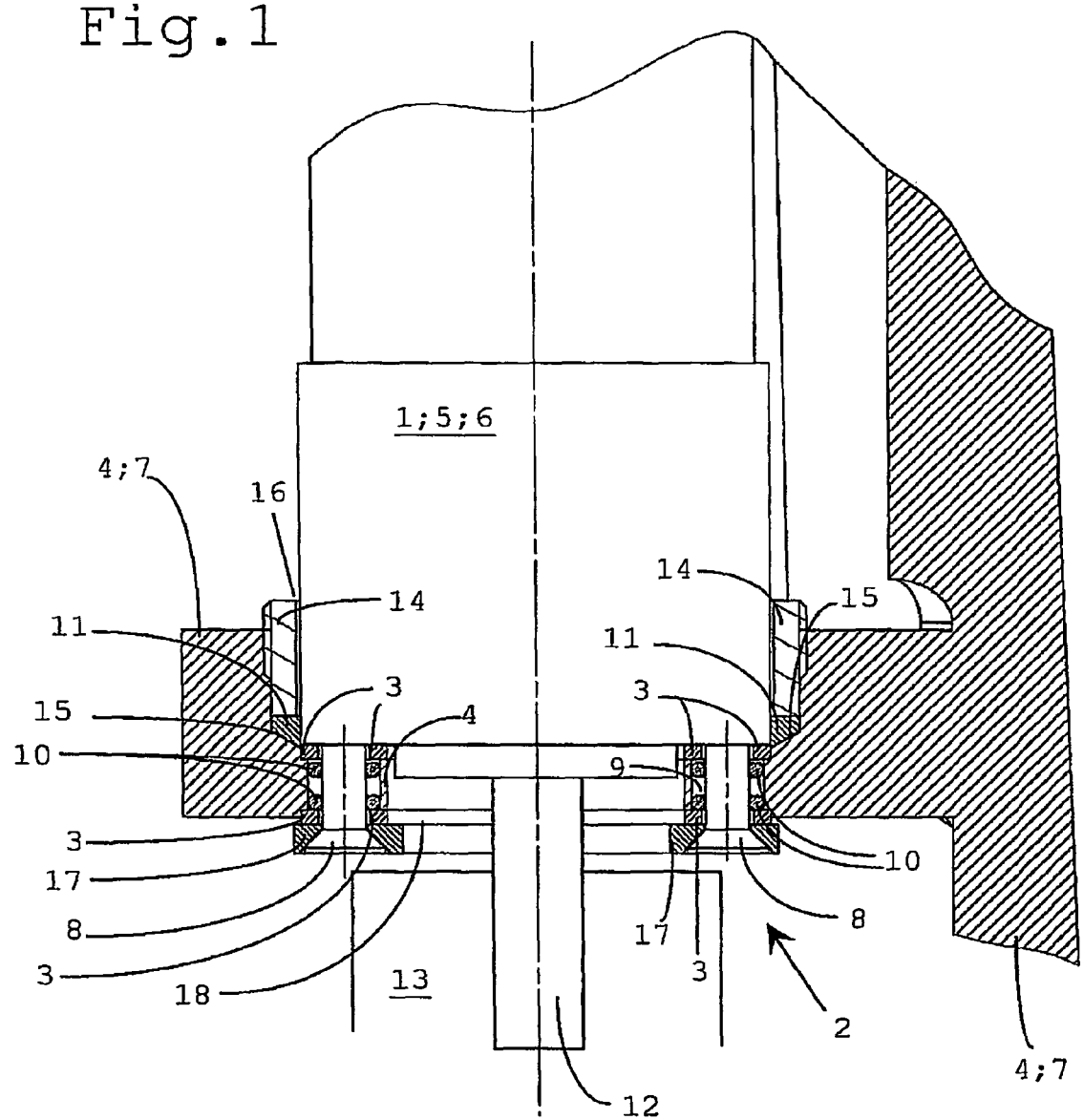
FIG. 1 is a sectioned depiction through the attachment flange with the spacing rings and the electric motor with screw-on ring.

FIG. 1 is a sectioned depiction through an attachment flange 7 having two spacers 3, which are embodied here as spacing rings made of brake lining material. Attachment flange 7 is arranged on a housing 4 and carries a component 1 that is embodied as an electrical drive system 5 or a miniature electric motor 6, having a drive shaft 12 that extends through a central opening 18 and having a gearbox 13. Gearbox 13 can also encompass a flexible coupling. Housing 4 may be part of a microscope stand (not shown) that supports a surgical microscope (also not shown).

Miniature electric motor 6 is of cylindrical configuration and is inserted centeredly, via a screw-on ring 14 and an O-ring 11, into a round opening in attachment flange 7. For that purpose, attachment flange 7 is embodied in conically tapering fashion in the region of O-ring 11.

O-ring 11 is placed into the cone and miniature electric motor 6 is inserted. O-ring 11 is pressed by screw-on ring 14 into conical aperture 15 of attachment flange 7, causing it to be placed around the end face of miniature electric motor 6. This ensures that the inside diameter of screw-on ring 14 has a larger dimension than the outside diameter of miniature electric motor 6, so that an air gap 16 exists between screw-on ring 14 and miniature electric motor 6. The lateral rubber mounting of miniature electric motor 6 by way of O-ring 11 ensures that no metallic contact exists between component 1 that generates solid-borne sound (in this case miniature electric motor 6) and housing 4 (in this case attachment flange 7).

Solid-borne sound damper 2 furthermore comprises two oppositely arranged spacing rings 3a, 3b made of brake lining material, having a hole 9 through which a screw 8 extends and is connected to miniature electric motor 6. Hole 9 also extends through attachment flange 7, so that when screw 8 is tightened, the two spacing rings 3a and 3b clamp attachment flange 7 on both sides and thus retain miniature electric motor 6 on attachment flange 7. Hole 9 is dimensioned in such a way that a receptacle for an O-ring exists between screw 8 and attachment flange 7 or spacing rings 3.

For secure retention, a metallic retaining ring 17, which of course can also be embodied as a washer, is arranged between spacing ring 3b and the head of screw 8. In order reliably to decouple screw 8 from the attachment flange and to exclude any contact, two O-rings 10 are arranged in hole 9 of attachment flange 7 so that metal-to-metal contact is ruled out here as well.

In the illustration, electrical drive system 5 is connected via two screws 8 to attachment flange 7 or to housing 4. More screw connections can, of course, also be provided for secure retention.

Figure 2:
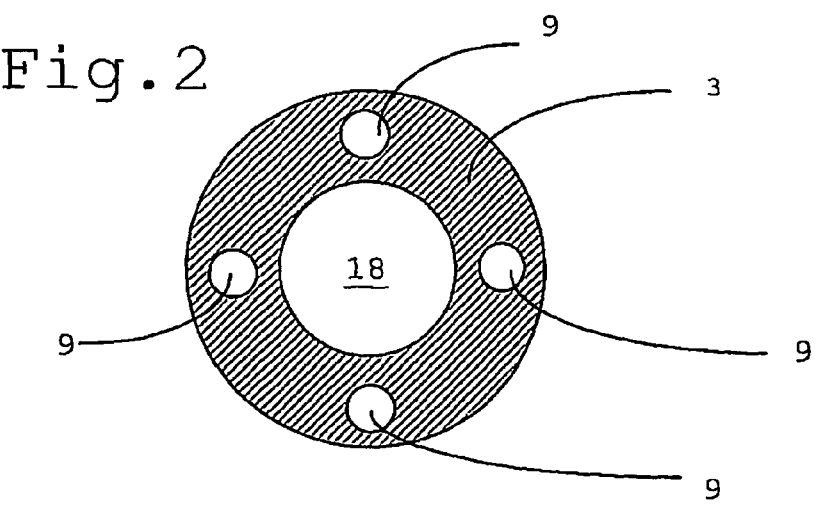
FIG. 2 is a view of the spacing ring made of brake lining material.

FIG. 2 is a plan view of spacing ring 3 made of brake lining material. Spacing ring 3 has four holes 9 and one opening 18. The brake lining material is a commercially available asbestos-free lining such as that used in drum brakes, and the term "brake lining material" means any commercially available asbestos-free brake lining material.

Figure 3:
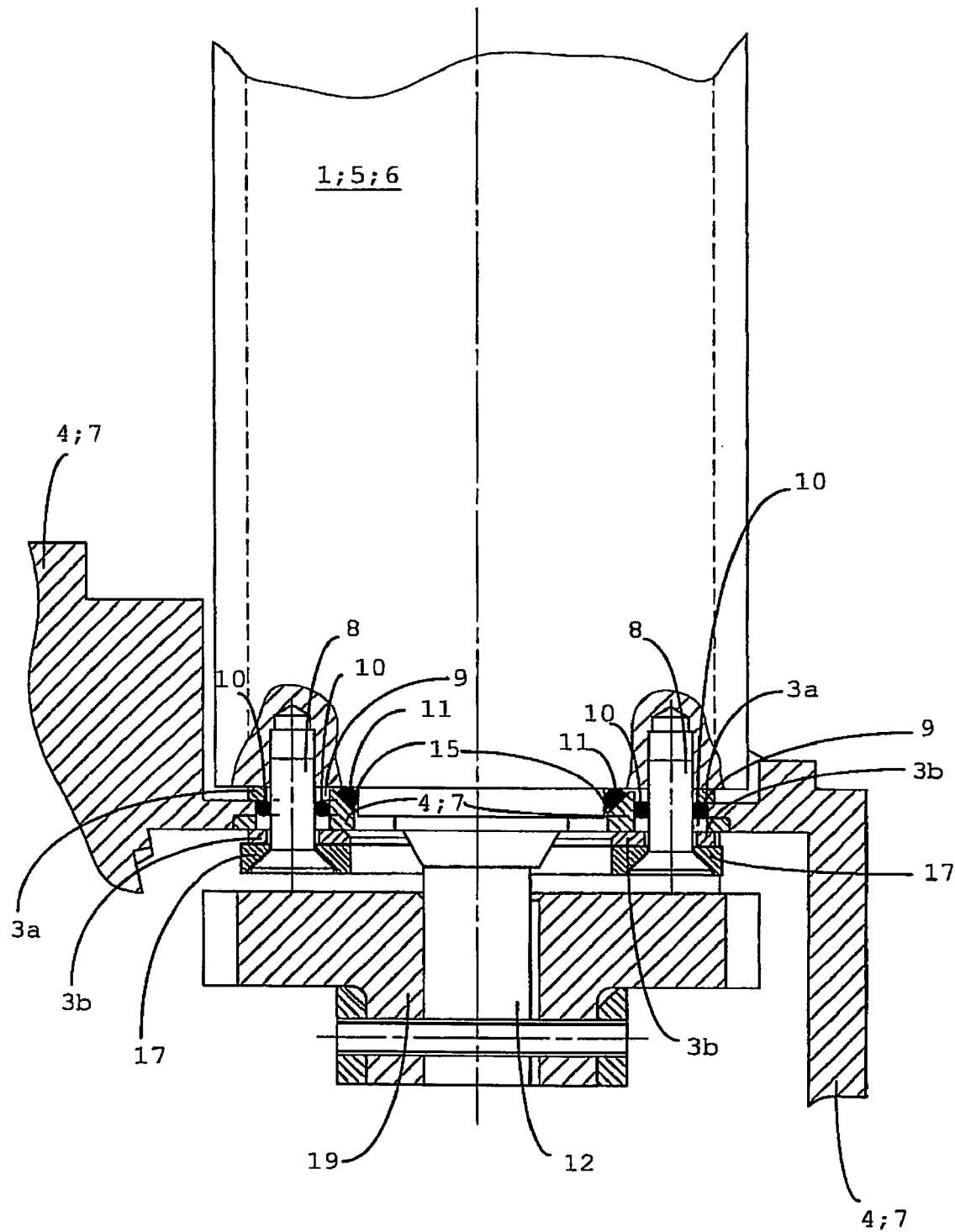
FIG. 3 is a sectioned depiction through the attachment flange with the spacing rings and the electric motor without a screw-on ring.

FIG. 3 is a sectioned depiction through attachment flange 7 with two spacing rings 3a; 3b made of brake lining material. Attachment flange 7 is a part of housing 4, and carries miniature electric motor 6 with drive shaft 12 and a gear 19 arranged thereon.

In this exemplifying embodiment, miniature electric motor 6 is centered not by way of a screw-on ring but by way of a cone that is provided directly on housing 4 or attachment flange 7, O-ring 11 being inserted into aperture 15 formed by the cone. Tightening screws 8 causes O-ring 11 to be pressed into conical aperture 15 of attachment flange 7, and to come into contact against the end face of miniature electric motor 6. As a result of this rubber mounting of miniature electric motor 11 by way of O-ring 11, no metallic contact exists between miniature electric motor 6 and housing 4.

In this exemplifying embodiment as well, the two oppositely arranged spacing rings 3a; 3b are made of brake lining material and comprise a hole 9 through which screw 8 extends and to which miniature electric motor 6 is connected.

Hole 9 is provided in attachment flange 7 so that when screws 8 are tightened, the two spacing rings 3 clamp attachment flange 7 on both sides and thus retain miniature electric motor 6 on attachment flange 7 or housing 4.

No direct metal-to-metal connection exists between miniature electric motor 6 and housing 4 or attachment flange 7, thus ruling out any transfer of irritating solid-borne sound.

PARTS LIST

1 Component
2 Solid-borne sound damper
3(a, b) Spacer, spacing ring made of brake lining material
4 Housing
5 Electrical drive system
6 Miniature electric motor
7 Attachment flange
8 Screw
9 Hole
10 O-ring
11 O-ring
12 Drive shaft
13 Gearbox, flexible coupling
14 Screw-on ring
15 Conical aperture in 7
16 Air gap
17 Metallic retaining ring
18 Opening
19 Gear

What is claimed is:

1. An apparatus comprising:
a vibration-transferring component;
a housing in which the component is retained; and
a solid-borne sound damper arranged between the housing and the component, wherein the solid-borne sound damper includes at least one spacer made of brake lining material, wherein the housing includes an attachment flange, and the damper includes a pair of spacers arranged on opposite sides of the attachment flange and connected non-positively to the attachment flange, further comprising at least one screw extending through aligned holes in the pair of spacers and the attachment flange and into the component to provide the non-positive connection.

2. The apparatus according to claim 1, further comprising at least one O-ring arranged between the screw and the attachment flange for vibration isolation of the screw.

3. The apparatus according to claim 1, wherein the at least one spacer has a diameter of 32 mm.

4. The apparatus according to claim 1, wherein the at least one spacer has a thickness of at least 0.5 mm.

5. The apparatus according to claim 1, wherein the spacer at least one has a thickness of 1 mm.

6. The apparatus according to claim 1, wherein the component is an electrical drive system.

7. The apparatus according to claim 6, wherein the electrical drive system is a miniature electric motor.

8. The apparatus according to claim 1, wherein the component is selected from a group consisting of a bearing, a gearbox, a shaft, and a spindle.

9. An apparatus comprising:
a vibration-transferring component;
a housing in which the component is retained; and
a solid-borne sound damper arranged between the housing and the component, wherein the solid-borne sound damper includes at least one spacer made of brake lining material, wherein the housing includes an attachment flange, and the damper includes a pair of spacers arranged on opposite sides of the attachment flange and connected non-positively to the attachment flange,
further comprising at least one screw extending through aligned holes in the pair of spacers and the attachment flange and into the component to provide the non-positive connection
wherein the component is connected to the attachment flange by a positively engaged connection, wherein the attachment flange includes a conical aperture, through which a portion of the component is received, and an O-ring is situated between an inner wall of the conical aperture and an outer wall of the component.

* * * * *